(12) United States Patent
Glazer et al.

(10) Patent No.: US 9,967,567 B2
(45) Date of Patent: May 8, 2018

(54) METHOD AND SYSTEM FOR ENHANCING IMAGE QUALITY OF COMPRESSED VIDEO STREAM

(71) Applicant: SCREENOVATE TECHNOLOGIES LTD., Ra'anana (IL)

(72) Inventors: Joshua Glazer, Ra'anana (IL); Sagiv Philipp, Ra'anana (IL)

(73) Assignee: SCREENOVATE TECHNOLOGIES LTD., Ra'anana (IL)

( * ) Notice: Subject to any disclaimer, the term of this patent is extended or adjusted under 35 U.S.C. 154(b) by 240 days.

(21) Appl. No.: 14/931,101

(22) Filed: Nov. 3, 2015

(65) Prior Publication Data

US 2016/0127748 A1 May 5, 2016

Related U.S. Application Data

(60) Provisional application No. 62/074,132, filed on Nov. 3, 2014.

(51) Int. Cl.

| | |
|---|---|
| *H04N 19/136* | (2014.01) |
| *H04N 19/65* | (2014.01) |
| *H04N 19/85* | (2014.01) |
| *H04N 19/895* | (2014.01) |
| *H04N 19/89* | (2014.01) |
| *H04N 19/00* | (2014.01) |

(52) U.S. Cl.
CPC .......... *H04N 19/136* (2014.11); *H04N 19/65* (2014.11); *H04N 19/85* (2014.11); *H04N 19/895* (2014.11); *H04N 19/00* (2013.01); *H04N 19/89* (2014.11)

(58) Field of Classification Search
None
See application file for complete search history.

(56) References Cited

U.S. PATENT DOCUMENTS

| | | | | |
|---|---|---|---|---|
| 2003/0023910 A1* | 1/2003 | Myler | .................. | H04N 17/004 714/704 |
| 2008/0088634 A1* | 4/2008 | Thompson | ............... | G09G 5/00 345/520 |
| 2011/0064276 A1* | 3/2011 | Tanaka | ................. | H04N 19/186 382/107 |
| 2013/0194295 A1* | 8/2013 | Chan | .................... | G09G 3/3466 345/619 |
| 2015/0058900 A1* | 2/2015 | Nakagawa | ..... | H04N 21/440218 725/90 |
| 2016/0239243 A1* | 8/2016 | Chang | .................. | G06F 3/1245 |

\* cited by examiner

*Primary Examiner* — Sathyanaraya V Perungavoor
*Assistant Examiner* — Janese Duley
(74) *Attorney, Agent, or Firm* — Browdy and Neimark, PLLC

(57) ABSTRACT

A method for enhancing image quality of compressed video stream, mirrored thorough wireless network using a compression scheme, between a source device and a sink device. The method includes identifying idle time in the compression scheme of video, where the image change is below a predefined threshold for pre-defined period of time, calculating color code corrections between an original source last image and a decoded last image, sending corrections from the source device to the sink device in real-time during identified idle time and performing an image correction at the sink device based on the received correction.

8 Claims, 4 Drawing Sheets

METHOD AND SYSTEM FOR ENHANCING IMAGE QUALITY OF COMPRESSED VIDEO STREAM

TECHNICAL FIELD

The present invention relates to the field of encoding video stream, and more particularly, to enhancing image quality of encoded video stream.

SUMMARY OF INVENTION

The present invention provides a method for enhancing image quality of compressed video stream, mirrored thorough wireless network using a compression scheme, between a source device and sink device. The method comprising the steps of: identifying idle time in the compression scheme of video, where the image change is bellow predefined threshold for pre-defined period of time, calculating color code corrections between original source last image and decoded last image, sending corrections from source device to sink device in real-time during identified idle time and performing image correction at sink device based on received correction;

The present invention provides a method for enhancing image quality of a compressed video stream, mirrored thorough wireless network using a compression scheme, between a source device and a sink device. The method includes identifying idle time in the compression scheme of the video; calculating color code corrections or corrected color values between at least two successive images, sending corrections from the source device to the sink device in real-time during identified idle time; and performing an image correction at the sink device based on the received calculated corrections.

At least one of the actions of identifying, calculating, sending or performing image correction is performed by at least one processor.

According to some embodiments of the present invention the idle time is identified when the image change is bellow predefined threshold for pre-defined period of time.

According to some embodiments of the present invention idle time is identified, when the change between the images has repeating pattern in short time periods.

According to some embodiments of the present invention the idle time is detected at the first time the calculating of the color code is based on comparing the decoded last mirrored image color code to color code of the original image.

According to some embodiments of the present invention the idle time is continuous the calculating of the color code is based on comparing original source last image and last corrected image displayed at the sink device or the previous image.

According to some embodiments of the present invention the method further comprising the step of decoding the image at source device for calculating the color code correction.

According to some embodiments of the present invention at the normal mode of the compression scheme operation image are encoded by a video decoder at the source device and decoded by video decoder at the sink device According to some embodiments of the present invention at the sink device are interlaced the corrected images and the imaged from a video decoder.

a. The present invention provides a system for enhancing image quality of compressed video stream, mirrored thorough wireless network using a compression scheme, between a source device and a sink device b. The system is comprised of:
monitoring module for identifying idle time period in the compression scheme of video, calculating color code corrections between at least two successive images and sending corrections from source device to the sink device in real-time during identified idle time. and
image correction module for performing image correction at sink device based on received calculated corrections.

According to some embodiments of the present invention the idle time is identified when the image change is bellow predefined threshold for pre-defined period of time.

According to some embodiments of the present invention idle time is identified, when the change between the images has repeating pattern in short time periods.

According to some embodiments of the present invention the idle time is detected at the first time the calculating of the color code is based on comparing the decoded last mirrored image color code to color code of the original image.

According to some embodiments of the present invention the idle time is continuous the calculating of the color code is based on comparing original source last image and last corrected image displayed at the sink device or the previous image.

According to some embodiments of the present invention the system further comprising a decoder module at the source device for decoding the image as basis for calculating the color code correction.

According to some embodiments of the present invention the system having a decoder module at the sink device and encoder at the source device, wherein at the normal mode of the compression scheme operation image are encoded by a video decoder at the source device and decoded by video decoder at the sink device.

According to some embodiments of the present invention at the sink device are interlaced the corrected images and the imaged from a video decoder.

These, additional, and/or other aspects and/or advantages of the present invention are: set forth in the detailed description which follows; possibly inferable from the detailed description; and/or learnable by practice of the present invention.

MODES FOR CARRYING OUT THE INVENTION

In the following detailed description of various embodiments, reference is made to the accompanying drawings that form a part thereof, and in which are shown by way of illustration specific embodiments in which the invention may be practiced. It is understood that other embodiments may be utilized and structural changes may be made without departing from the scope of the present invention.

The term "computerized mobile device" as used herein in this application, is defined as a mobile device with capability of running applications as well as streaming multimedia data to a screen that is external to the computerized mobile device (e.g. a mobile phone or a tablet device).

Figure 1:
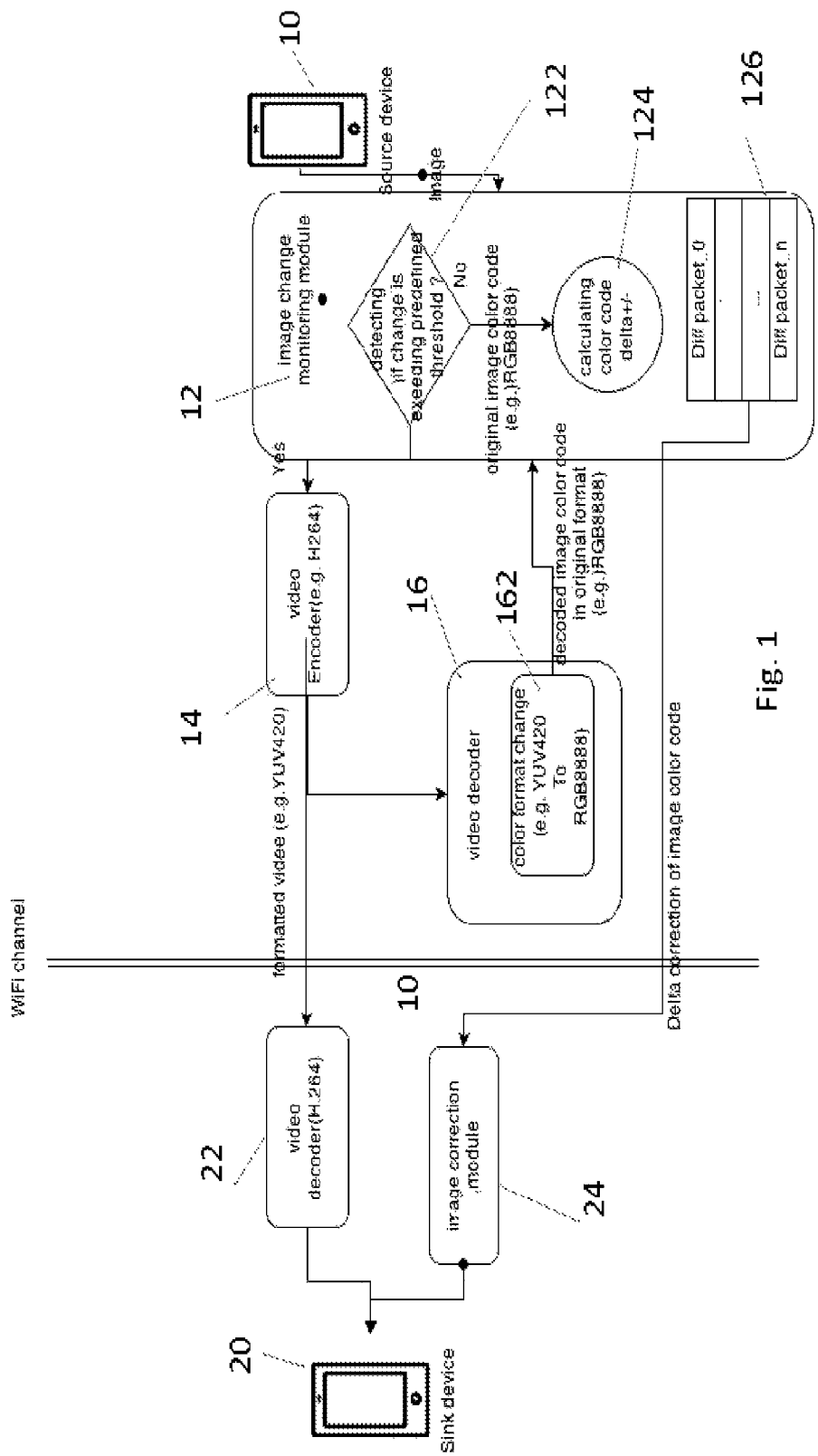
FIG. 1 is a flow-block diagram of the components involved is the compression scheme enhancement, according to some embodiments of the invention.

FIG. 1 is a flow-block diagram of the components involved is the compression scheme enhancement, according to some embodiments of the invention. An original image is streamed through wireless network such as WIFI is streamed from a source device 10, to Sink device 20, such as computerized mobile device, the image is compressed, using a video encoding scheme such as H264. When compressing the images of the video, the color coding for formatting is changed (e.g. form RGB to YUV) such that the chroma information can be further sub-sampled (e.g YUV 4:2:0) and stored in less resolution, taking advantage of the human visual system's lower acuity for color differences than for luminance. As a result, the decoded image quality is reduced at the Sink end. The present invention provide enhancing quality of streamed images through the encoding procedure by calculating the difference of the image pixels coding between the original image and the decoded image and transmitting said differences to the sink device during idle time.

The present invention provides a monitoring module (12) for identifying changes between proceeding images in the video stream (122), in case the changes exceed predefined threshold, the images are formatted and compressed by the video encoder 14, the encoded video is streamed to the video decoder at the sink device. In case the changes exceed predefined threshold, color code differences are calculated (124) between the last original image and the last image decoded by the video decoder 16 located at the source device. The calculated differences are transferred to the image correction module 24, during idle time when no encoded images are streamed between the source device and the sink device. Optionally, are transmitted only corrected color values and not the differences.

Figure 2:
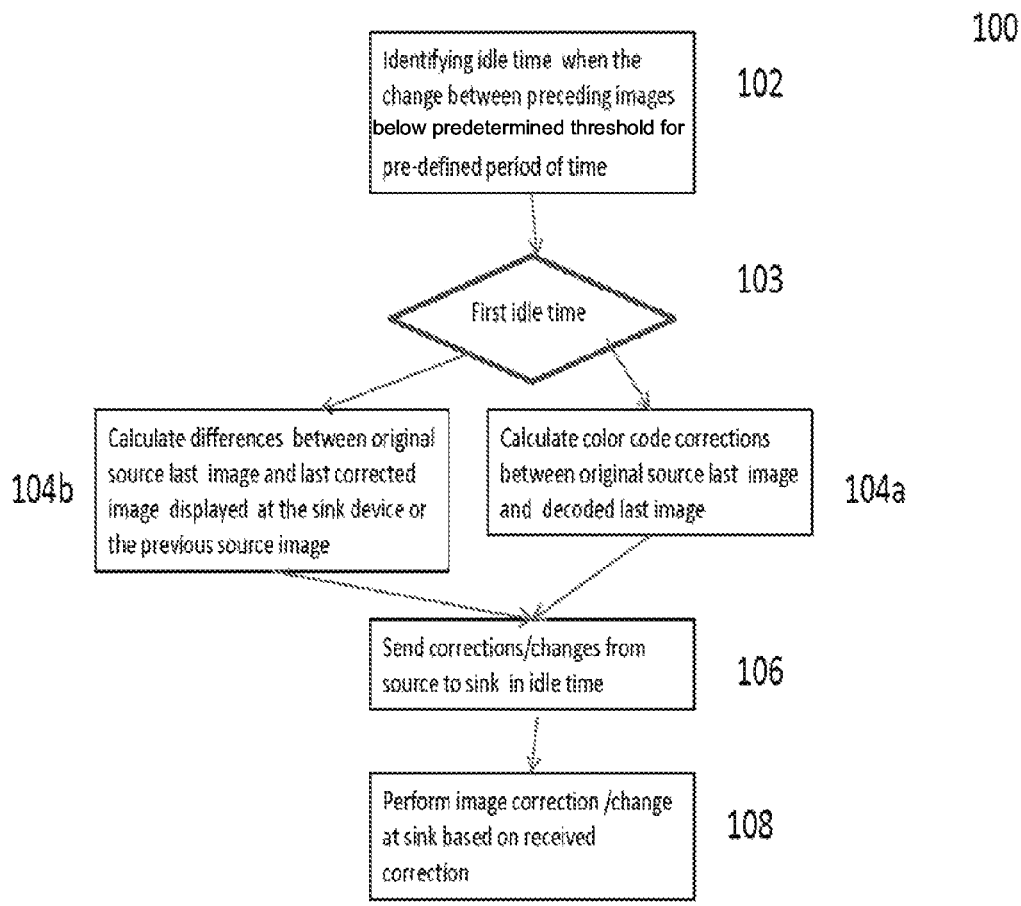
FIG. 2 shows flowchart illustrating a method enhancing the compression scheme, according to some embodiments of the invention.

FIG. 2 shows flowchart illustrating a method for enhancing the compression scheme, according to some embodiments of the invention. The method according to some embodiments include the following steps: Identifying idle time, when the change between preceding images is bellow pre-defined threshold for pre-defined period of time (102), in case of idle time detected for the first time (103) calculating color code corrections between original source last image and decoded last image (104a), in case of identifying continues idle time (continuous idle time is idle time detected continuous after the previous idle time) calculate changes between original source last image and last corrected image displayed at the sink device which is equivalent the previous source image and send corrections or changes from source device to the sink during idle time (106).

Continues idle time may be occur when new images has small changes from the last corrected image, where no encoding was performed on the previous image, for example in typing mode only single character is changed, accordingly it is not required to use the encoder, only transmitting the changes of the typed characters.

Figure 3:
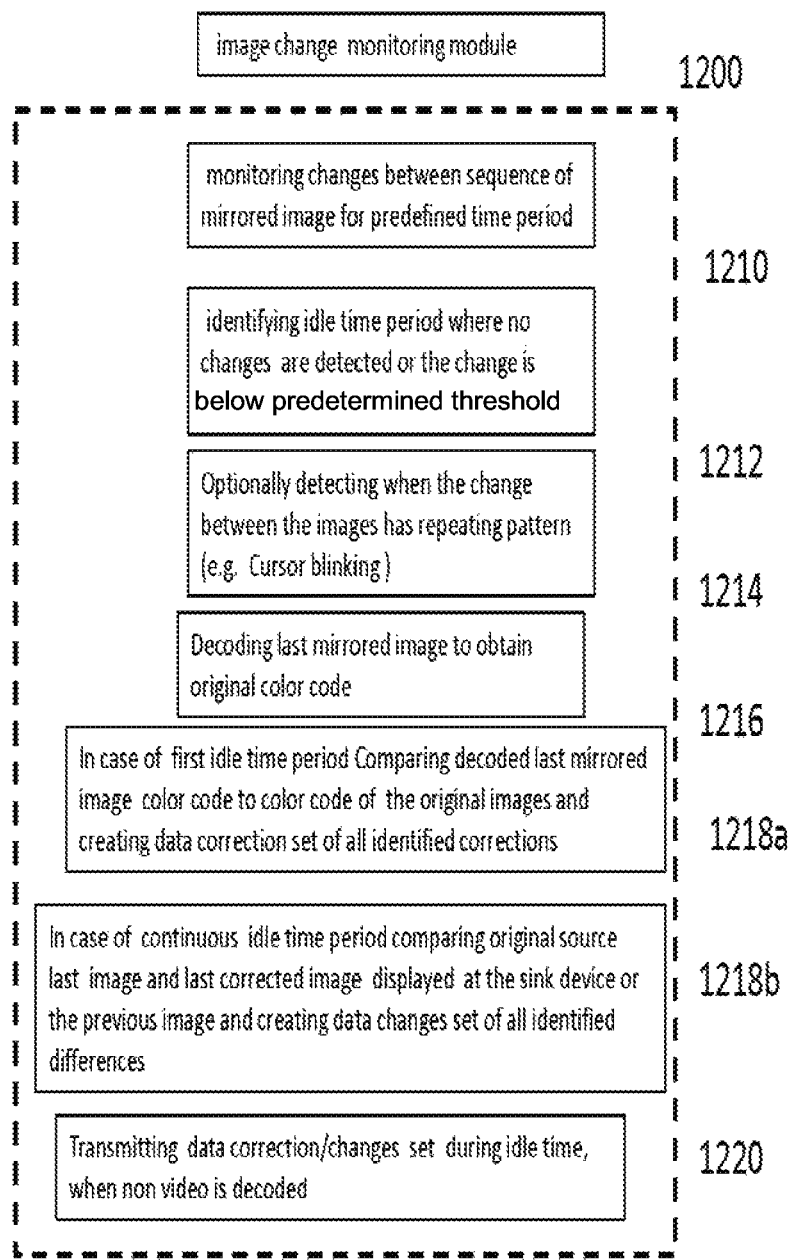
FIG. 3 is a flowchart illustrating a method image change monitoring module, according to some embodiments of the invention.

FIG. 3 is a flowchart illustrating the method of image change monitoring module, according to some embodiments of the invention.

The monitoring module performs at least one of the following steps:—monitoring changes between sequence of mirrored image for predefined time period (1210), identifying idle time period where no changes are detected or the changes are bellow predefined threshold (1212), optionally identifying idle time when detecting that the change between the images has repeating pattern in short time periods (e.g. Cursor blinking) (1214), decoding last mirrored image to obtain original color code (1216), in case of identified first idle period comparing decoded last mirrored image color code to color code of the original image and creating data correction set of all identified corrections (1218*0a*), in case of continuous idle time period comparing original source last image and last corrected image displayed at the sink device or the previous image and creating data changes set of all identified differences (1218*b*) and transmitting data correction or changes set during idle time, when non video is decoded (1220).

Figure 4:
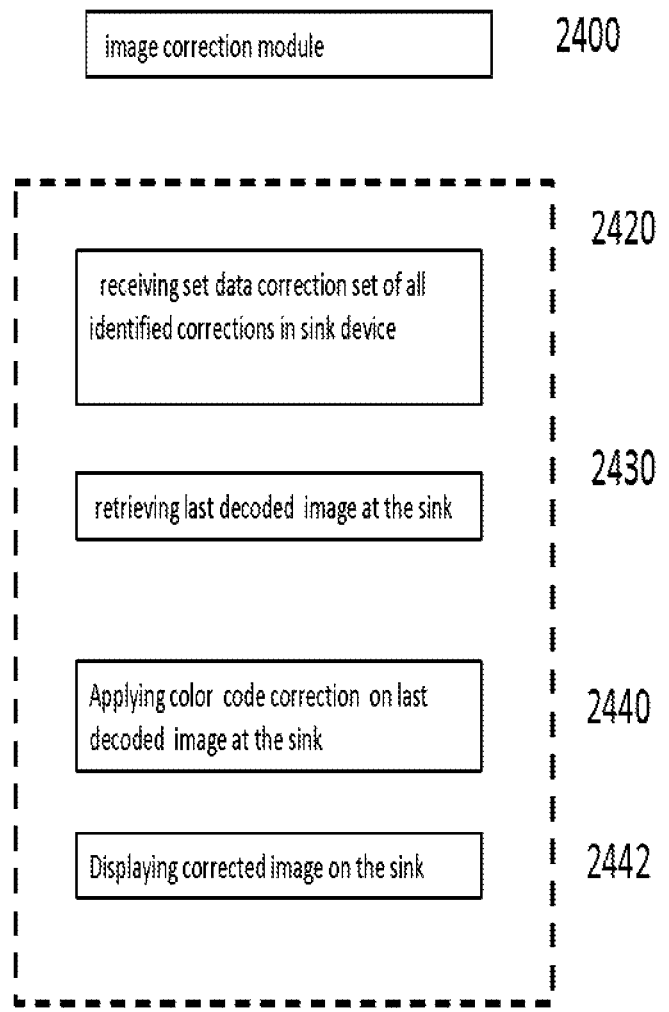
FIG. 4 is a flowchart illustrating a method of image correction module, according to some embodiments of the invention.

FIG. 4 is a flowchart illustrating the method of image correction module, according to some embodiments of the invention. The image correction module perform at least one of the following steps: receiving set data correction set of all identified corrections in sink device (2240), retrieving last decoded image at the sink (2250), Applying color code correction, on last decoded image at the sink (2260) and displaying corrected image on the sink.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim.

Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

Although the invention has been described in detail, nevertheless changes and modifications, which do not depart from the teachings of the present invention, will be evident to those skilled in the art. Such changes and modifications are deemed to come within the purview of the present invention and the appended claims.

What is claimed is:

1. A computer-implemented method for enhancing image quality of a compressed video stream, mirrored by a wireless network using a compression scheme, between a source device and a sink device, said method comprising the steps of:
    identifying at the source device an idle time for a first time after streaming an original image in the compression scheme of the video stream;
    determining at the source device a first color code of the original image;
    decoding at the source device a last mirrored image to determine a second image color code of the last mirrored image,
    calculating at the source device a corrected color code from a difference between the first color code and the second color code;
    sending the corrected color code from the source device to the sink device in real-time during the identified idle time; and
    performing an image correction at the sink device based on the corrected color code.

2. The method of claim 1, wherein the idle time is identified by a change between the original image and the last mirrored image that is less than a predefined threshold for a pre-defined period of time.

3. The method of claim 1, wherein the idle time is further identified when the change between the images has a repeating pattern for short time periods.

4. The method of claim 1, wherein performing the image correction comprises interlacing corrected images derived from the corrected color code with a decoded image.

5. A system for enhancing image quality of a compressed video stream, mirrored by a wireless network using a compression scheme, said system comprised of:
    a source device comprising a source device processor and a source device memory having instructions that when executed by the source device processor cause the source device to perform steps of:
        identifying a first instance of an idle time after streaming an original image in the compression scheme of the video stream, determining at the source device a first color code of the original image;
        decoding at the source device a last mirrored image to determine a second image color code of the last mirrored image,
        calculating a corrected color code from a difference between the first color code and the second color code, and
        sending the corrected color code to a sink device in real-time during the identified idle time; and
    wherein the sink device comprises a sink device processor and a sink device memory comprising stored therein instructions that when executed by the sink device processor cause the sink device to receive the corrected color code and to perform an image correction based on the corrected color code.

6. The system of claim 5, wherein the idle time is identified by a change between the original image and the last mirrored image being less than a predefined threshold for a pre-defined period of time.

7. The system of claim 5, wherein the idle time is further identified when the change between the images has a repeating pattern for short time periods.

8. The system of claim 1, wherein the sink device is further configured to perform the image correction by interlacing corrected images derived from the corrected color code and with a decode image.

* * * * *